(12) United States Patent
Kim et al.

(10) Patent No.: US 11,345,230 B2
(45) Date of Patent: May 31, 2022

(54) VALVE SYSTEM OF FUEL PUMP FOR VEHICLE

(71) Applicants: Hyundai Motor Company, Seoul (KR); Kia Motors Corporation, Seoul (KR)

(72) Inventors: Keun Soo Kim, Gyeonggi-do (KR); Jung Hoon Park, Gyeonggi-do (KR); Dong Hyun Kim, Gyeonggi-do (KR); Seung Kyun Lee, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 17/036,423

(22) Filed: Sep. 29, 2020

(65) Prior Publication Data

US 2021/0101472 A1  Apr. 8, 2021

(30) Foreign Application Priority Data

Oct. 8, 2019 (KR) .......................... 10-2019-0124273

(51) Int. Cl.
*B60K 15/03* (2006.01)
*F02D 41/06* (2006.01)
(Continued)

(52) U.S. Cl.
CPC ............ *B60K 15/03* (2013.01); *F02D 33/003* (2013.01); *F02D 41/062* (2013.01);
(Continued)

(58) Field of Classification Search
CPC .......... B60K 15/03; B60K 2015/03105; B60K 2015/0325; B60K 2015/03256;
(Continued)

(56) References Cited

U.S. PATENT DOCUMENTS 7,909,023 B2 * 3/2011 Aoki ................... F02M 37/0029
123/516
2005/0045159 A1 * 3/2005 Honda ................. F02M 37/106
123/509
(Continued)

FOREIGN PATENT DOCUMENTS

JP   2005-147037 A   6/2005
JP   2006-266229 A   10/2006
(Continued)

*Primary Examiner* — Sizo B Vilakazi
(74) *Attorney, Agent, or Firm* — Mintz Levin Cohn Ferris Glovsky and Popeo, P.C.; Peter F. Corless (57) ABSTRACT

A valve system of a fuel system for a vehicle may close a jet pump-side flow path when a pressure of fuel supplied from a fuel pump to an engine is lower than a prescribed fuel pressure at engine start-up, and open the jet pump-side flow path when the pressure of fuel is equal to or higher than the prescribed fuel pressure at the engine start-up, thereby improving cold startability of an engine, and may also allow the jet pump-side flow path to be kept in an opened state between a low load region and a high load region of the engine after the engine start-up, thereby smoothly keeping a function of the jet pump after the engine start-up.

8 Claims, 7 Drawing Sheets

(51) Int. Cl.
    *F02D 33/00*     (2006.01)
    *F16K 15/04*     (2006.01)

(52) U.S. Cl.
    CPC .... *F16K 15/044* (2013.01); *B60K 2015/0325* (2013.01); *B60K 2015/03105* (2013.01); *B60K 2015/03256* (2013.01)

(58) Field of Classification Search
    CPC .... F02D 41/062; F02D 33/003; F02D 33/006; F16K 15/044; F02M 37/18; F02M 37/0023; F02M 37/106; F04F 5/10; F04F 5/48; F04F 5/54; F04F 5/44
    See application file for complete search history.

(56) References Cited

U.S. PATENT DOCUMENTS

| | | | |
|---|---|---|---|
| 2006/0231079 A1* | 10/2006 | Paluszewski | F02M 37/025 123/514 |
| 2013/0248027 A1* | 9/2013 | Gutscher | F02M 37/025 137/565.11 |

FOREIGN PATENT DOCUMENTS

| | | |
|---|---|---|
| JP | 2006-300055 A | 11/2006 |
| JP | 5792589 B2 | 10/2015 |
| KR | 10-0227465 | 12/1999 |
| KR | 10-0660684 B1 | 12/2006 |

\* cited by examiner

— WHEN ENGINE IS DRIVEN —
(LOW LOAD OF ENGINE~HIGH LOAD OF ENGINE)

VALVE SYSTEM OF FUEL PUMP FOR VEHICLE

CROSS-REFERENCE TO RELATED APPLICATION

This application claims under 35 U.S.C. § 119(a) the benefit of Korean Patent Application No. 10-2019-0124273 filed on Oct. 8, 2019, the entire contents of which are incorporated herein by reference.

BACKGROUND

(a) Technical Field

The present disclosure relates to a valve system of a fuel pump for a vehicle, more particularly, to the valve system of the fuel pump for improving cold startability of an engine.

(b) Description of the Related Art

Generally, a fuel supply system of a vehicle is a system for smoothly supplying fuel required for an engine under all driving conditions, and is one of the factors which has a significant influence on outputor performance of the engine.

In recent years, in order to improve the output, performance, or the like of the engine in various traveling conditions, a jet pump system is employed to smoothly fill in a reservoir cup of a fuel tank with fuel even under the condition of maximum fuel consumption of the engine.

Figure 1:
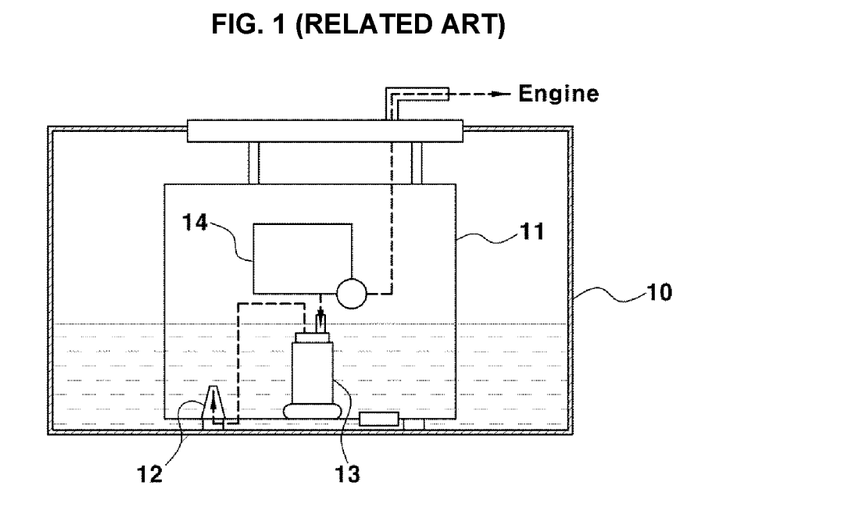
FIG. 1 (RELATED ART) is a schematic diagram illustrating a fuel supply system according to one example of the related art.

FIG. 1 (RELATED ART) is a schematic diagram illustrating a fuel supply system according to one example of the related art.

Referring to FIG. 1, the fuel supply system is configured to include a single type fuel tank 10 for storing fuel, a reservoir cup 11 installed on a bottom side of the fuel tank 10 to be continuously filled with fuel in the fuel tank, a fuel pump 13 for pumping fuel in the reservoir cup 11 to an engine and discharging some fuel to a jet pump 12, a fuel filter 14 installed inside the reservoir cup 11 to filter fuel supplied into the engine, the jet pump 12 installed on a bottom side of the reservoir cup 11 to suck the fuel in the fuel tank into the reservoir cup 11 and fill the reservoir cup, and the like.

In the fuel supply system according to the conventional example, when fuel is pumped from the fuel pump 13 to the engine by driving the fuel pump 13, some fuel is discharged toward the jet pump 12.

Subsequently, when fuel discharged toward the jet pump 12 passes through the jet pump 12, a momentary vacuum suction force is generated in the jet pump 12.

Accordingly, the fuel present in the fuel tank 10 is sucked into and filled in the reservoir cup 11 by the momentary vacuum suction force of the jet pump 12.

Figure 2:
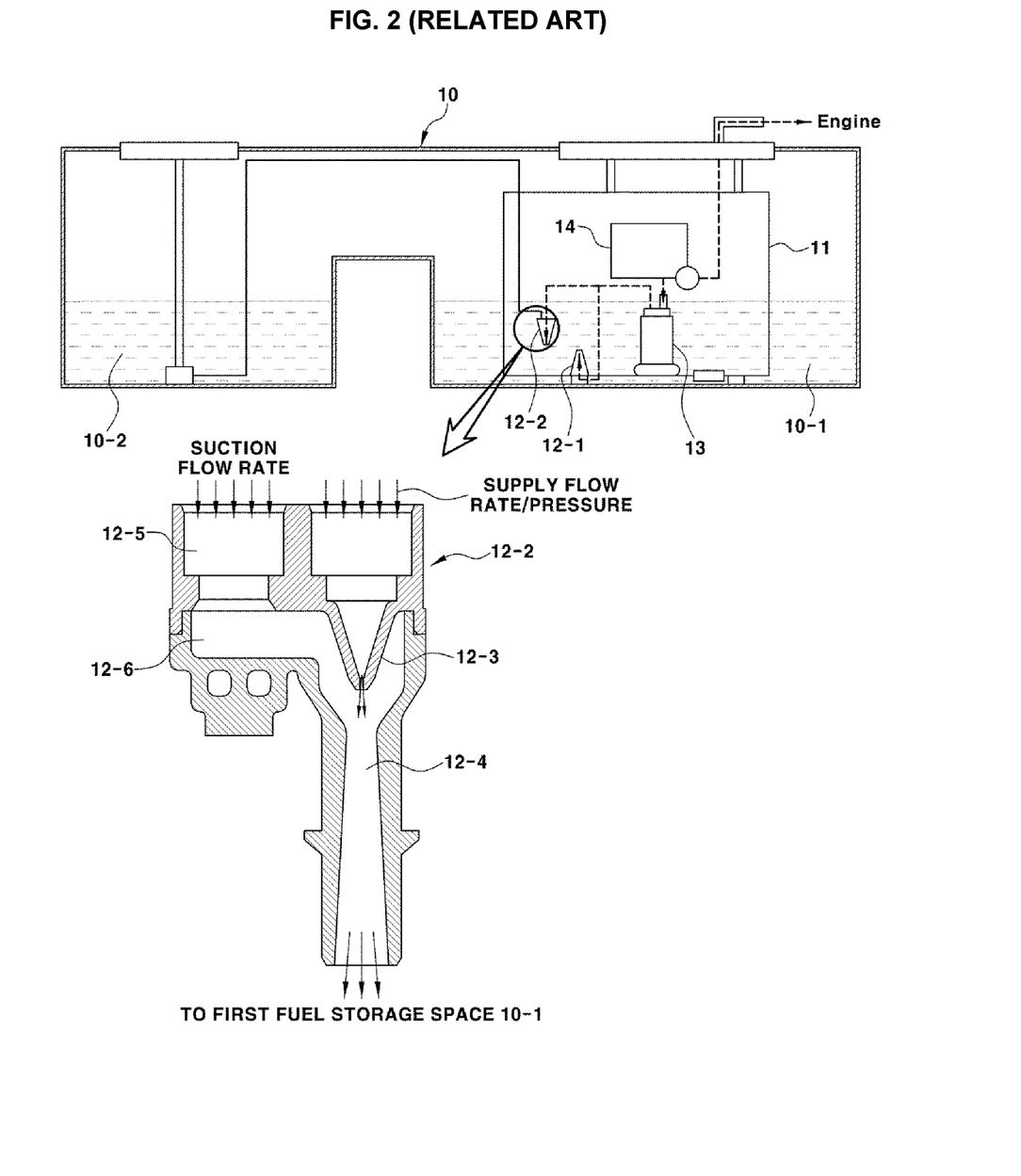
FIG. 2 (RELATED ART) is a schematic diagram illustrating a fuel supply system according to another example of the related art.

FIG. 2 (RELATED ART) is a schematic diagram illustrating a fuel supply system according to another example of the related art.

Referring to FIG. 2, the fuel supply system is configured to include a saddle type fuel tank 10 divided into a first fuel storage space 10-1 and a second fuel storage space 10-2, a reservoir cup 11 installed on a bottom side of the first fuel storage space 10-1 of the fuel tank 10 to be continuously filled with fuel in the fuel tank, a fuel pump 13 for pumping the fuel in the reservoir cup 11 to an engine and discharging some fuel to first and second jet pumps 12-1, 12-2, a fuel filter 14 installed inside the reservoir cup 11 to filter fuel to be supplied to the engine, the first jet pump 12-1 installed on a bottom side of the reservoir cup 11 to suck the fuel in the first fuel storage space 10-1 of the fuel tank into the reservoir cup 11 and fill the reservoir cup with fuel, the second jet pump 12-2 mounted at a predetermined location inside the reservoir cup 11 to suck the fuel in the first fuel storage space 10-1 of the fuel tank into the reservoir cup 11 and fill the reservoir cup with fuel, and the like.

According to a vehicle model, as the fuel tank 10, the single type tank may be employed as illustrated in FIG. 1, or the saddle type tank divided into the first fuel storage space 10-1 and the second fuel storage space 10-2 may be employed as illustrated in FIG. 2.

If the saddle type fuel tank is employed as the fuel tank 10, in addition to the first jet pump 12-1 installed on the bottom side of the reservoir cup 11 to vacuum-suck the fuel in the first fuel storage space 10-1 of the fuel tank into the reservoir cup 11 and fill the reservoir cup with fuel as illustrated in FIG. 2, the second jet pump 12-1 for vacuum-sucking the fuel in the second fuel storage space 10-2 into the reservoir cup 11 is mounted in the reservoir cup 11.

In the aforementioned fuel supply system according to another example of the related art, when fuel is pumped from the fuel pump 13 to the engine by driving the fuel pump 13, some fuel is discharged toward the first and second jet pumps 12-1, 12-2.

At this time, reviewing an internal configuration of the first and second jet pumps 12-1, 12-2, a jet nozzle 12-3 and a discharge pipe 12-4 through which the fuel discharged from the fuel pump 13 passes are formed in a line on one side as illustrated in FIG. 2, and a fuel inlet port 12-5 connected to be in communication with the second fuel storage space 10-2 of the fuel tank 10 and a fuel suction path 12-6 extending to be in communication with the discharge pipe 12-4 are formed on the other side.

Accordingly, when fuel is pumped from the fuel pump 13 to the engine, if some fuel is rapidly injected through the jet nozzles 12-3 in the first and second jet pumps 12-1, 12-2 and thus re-filled in the reservoir cup 11 through the discharge pipe 12-4, a vacuum suction force generated according to the principle of the jet pump acts on the fuel suction path 12-6 and the fuel inlet port 12-5.

Subsequently, the fuel present in the first and second fuel storage spaces 10-1, 10-2 of the fuel tank 10 is sucked through the fuel inlet port 12-5 and the fuel suction path 12-6 by the vacuum suction force acting on the fuel suction path 12-6 and the fuel inlet port 12-5, and then passes through the discharge pipe 12-4 to be filled in the reservoir cup 11.

As described above, in the saddle type fuel tank, the fuel present in the first fuel storage space 10-1 of the fuel tank 10 may be easily filled in the reservoir cup 11 by vacuum suction pumping of the first jet pump 12-1, and the fuel present in the second fuel storage space 10-2 of the fuel tank 10 may be easily filled in the reservoir cup 11 by vacuum suction pumping of the second jet pump 12-2.

However, when the saddle type fuel tank is employed as the fuel tank 10, as the first jet pump 12-1 and the second jet pump 12-2 are used, there is a problem in that a time required for increasing a pressure of fuel supplied to the engine at the engine cold start-up is delayed.

That is, when fuel is pumped from the fuel pump to the engine at the engine cold start-up, some fuel discharged to the first and second jet pumps acts as loss of the flow rate, so that there is a problem in that it takes a long time to increase the pressure of fuel supplied from the fuel pump to the engine to a prescribed fuel pressure required for the start-up, which results in a problem of deteriorating cold startability which prevents the engine from starting-up smoothly in winter season.

Figure 3:
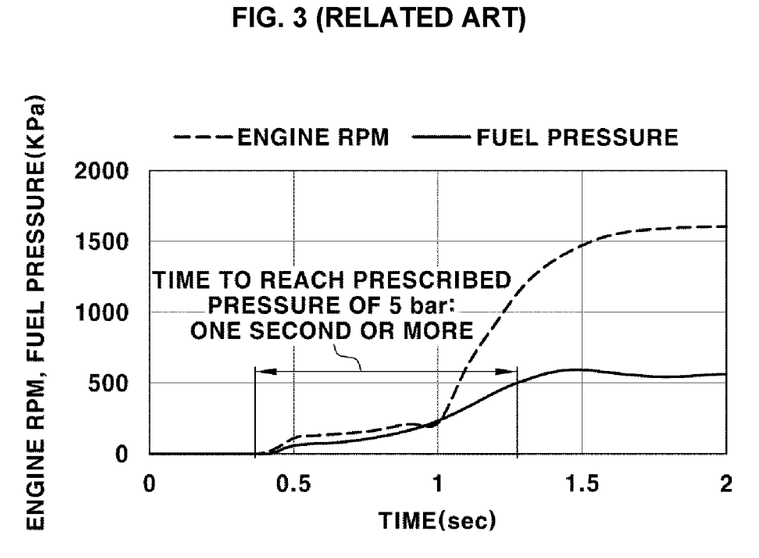
FIG. 3 (RELATED ART) is a graph illustrating an evaluation result of cold startability of an engine for the conventional fuel supply system.

For example, the time required for increasing the pressure of fuel supplied from the fuel pump to the engine to the prescribed fuel pressure at the engine cold start-up is preferably about 250 ms or less, but as illustrated in FIG. 3 (RELATED ART), the time required for increasing the fuel pressure to the prescribed fuel pressure is delayed by about 1 second or more, which results in a problem of deteriorating cold startability of the engine.

The above information disclosed in this Background section is only for enhancement of understanding of the background of the disclosure and therefore it may contain information that does not form the prior art that is already known in this country to a person of ordinary skill in the art.

SUMMARY

The present disclosure provides a valve system of a fuel system for a vehicle, which may close a jet pump-side flow path when a pressure of fuel supplied from a fuel pump to an engine is lower than a prescribed fuel pressure at engine start-up, and open the jet pump-side flow path when the pressure of fuel is equal to or higher than the prescribed fuel pressure at the engine start-up, thereby improving cold startability of the engine, and may also allow the jet pump-side flow path to be kept in an opened state between a low load region and a high load region of the engine after the start-up, thereby smoothly keeping a function of the jet pump after the engine start-up.

For achieving the object, the present disclosure provides a valve system of a fuel pump for a vehicle, which may include a reservoir cup mounted in a fuel tank; a jet pump for filling the reservoir cup with fuel in the fuel tank; a fuel pump on which a first discharge port for discharging the fuel in the reservoir cup to an engine and a second discharge port for discharging some fuel discharged to the engine to the jet pump are formed; and a jet pump control valve mounted on the second discharge port of the fuel pump, in which the jet pump control valve is configured to close a jet pump-side flow path toward the jet pump when a pressure of fuel supplied from the fuel pump to the engine is lower than a prescribed fuel pressure at engine start-up, to open the jet pump-side flow path toward the jet pump when the fuel pressure is equal to or higher than the prescribed fuel pressure at the engine start-up, and to keep the jet pump-side flow path in an opened state even between a low load region and a high load region of the engine after the start-up.

The jet pump control valve according a preferred exemplary embodiment of the present disclosure is composed of a first valve body having a plunger ascending/descending path having a predetermined height formed therein, and having the jet pump-side flow path toward the jet pump formed at an intermediate location of the plunger ascending/descending path; a second valve body provided in a structure having a friction path formed therein and formed on an upper portion of the first valve body to be in communication with the first valve body; a plunger located in the plunger ascending/descending path to ascend/descend; a valve head located to be in friction contact with the friction path and to ascend/descend; an ascending/descending bar connected between the plunger and the valve head; and a spring connected between an upper end of the second valve body and an upper surface of the plunger to be compressed.

The plunger ascending/descending path is composed of an upper ascending/descending path in which the plunger is located to allow the jet pump-side flow path to be opened, and a lower ascending/descending path in which the plunger is located to allow the jet pump-side flow path to be closed.

The valve head is formed in a ball structure which is in friction contact with an inner surface of the friction path.

The friction path may have locking protrusions formed on the upper end and the lower end thereof, the locking protrusion limiting an ascending/descending distance of the valve head.

Particularly, the total pressure obtained by summing a first pressure acting on the plunger to allow the valve head to frictionally ascend/descend from a lower portion to an upper portion of the friction path, and a second pressure for compressing the spring when the plunger and the valve head ascend is set to be equal to or higher than the prescribed fuel pressure at the engine start-up at which fuel is supplied from the fuel pump to the engine.

Accordingly, when the pressure of fuel supplied from the fuel pump to the engine is lower than the prescribed fuel pressure at the engine start-up, the valve head is located on a lower portion of the friction path and the plunger is located in the lower ascending/descending path of the plunger ascending/descending path to allow the jet pump-side flow path to be kept in a closed state.

In addition, when the pressure of fuel supplied from the fuel pump to the engine is equal to or higher than the prescribed fuel pressure at the engine start-up, the plunger ascends to the upper ascending/descending path of the plunger ascending/descending path, and the valve head ascends to an upper portion of the friction path while compressing the spring to allow the jet pump-side flow path to be opened.

In addition, even though the pressure of fuel supplied from the fuel pump to the engine drops below the prescribed fuel pressure at the engine start-up in the low load region and an intermediate load region of the engine after the engine start-up, when the fuel pressure is equal to or higher than the second pressure for compressing the spring, the plunger is continuously located in the upper ascending/descending path of the plunger ascending/descending path and the valve head is also continuously located on an upper portion of the friction path to allow the jet pump-side flow path to be continuously kept in an opened state.

Preferably, a cover having the spring connected to the bottom surface thereof is detachably mounted to an upper end of the second valve body.

Through the above configurations, the present disclosure provides the following effects.

Firstly, by closing the jet pump-side flow path until the pressure of fuel supplied from the fuel pump to the engine reaches the prescribed fuel pressure at the engine start-up, it is possible to remove the loss of fuel discharged to the jet pump at the engine cold start-up, thus to shorten the time required for increasing the pressure of fuel supplied from the fuel pump to the engine to the prescribed fuel pressure at the engine cold start-up, and as a result, to improve cold startability of the engine.

Secondly, by opening the jet pump-side flow path after the engine start-up, and then keeping the jet pump-side flow path in the opened state even between the low load region and the high load region of the engine, it is possible to smoothly keep the jet pump's own function which fills the reservoir cup with the fuel in the fuel tank after the engine start-up.

Other aspects and preferred embodiments of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter reference will now be made in detail to various exemplary embodiments of the present disclosure, examples of which are illustrated in the accompanying drawings and described below. While the disclosure will be described in conjunction with exemplary embodiments, it will be understood that present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

Hereinafter, preferred exemplary embodiment of the present disclosure is described in detail with reference to the accompanying drawings.

Figure 4:
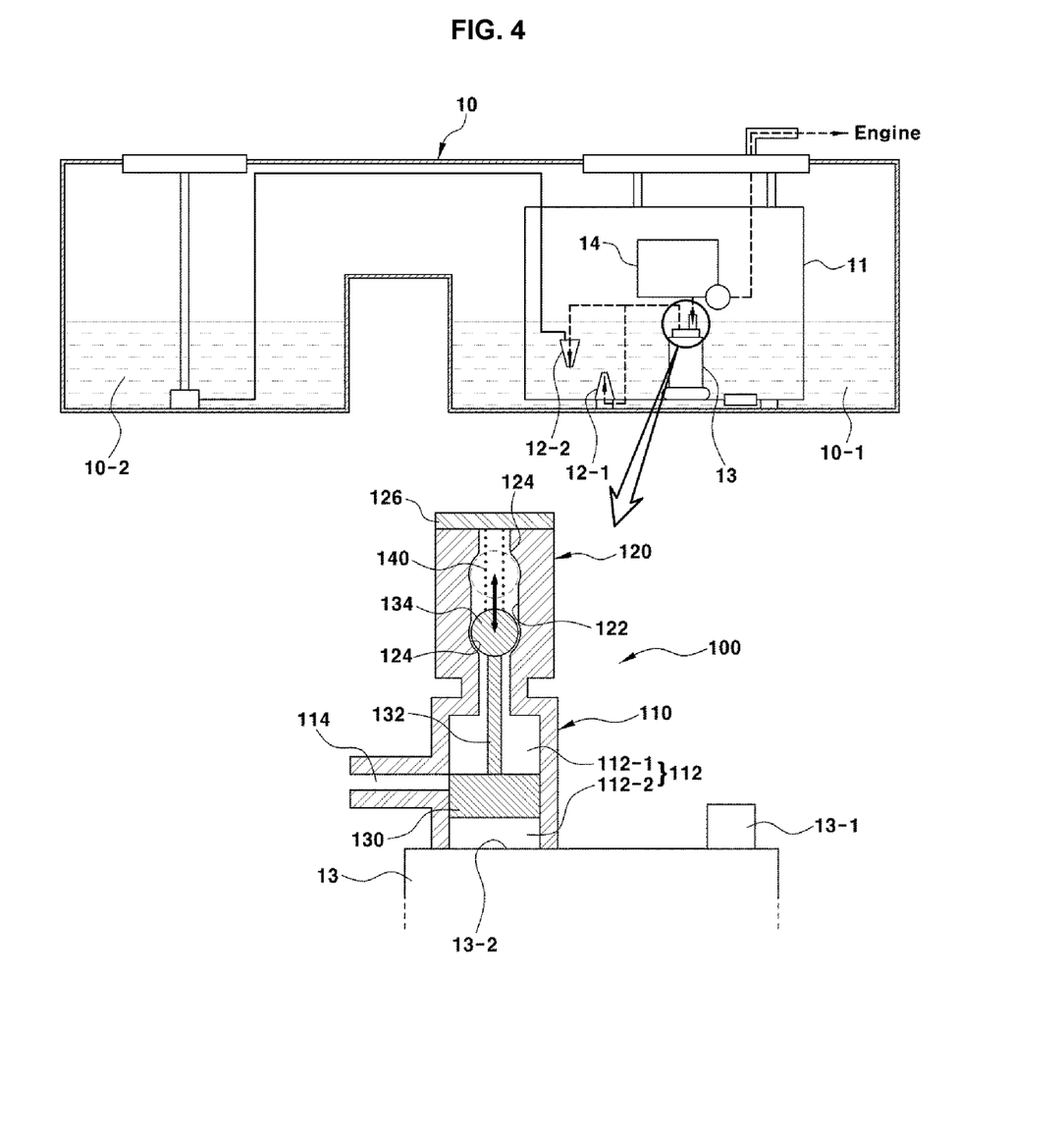
FIG. 4 is a partial enlarged cross-sectional diagram illustrating a valve system of a fuel pump for a vehicle according to the present disclosure.

FIG. 4 illustrates a valve system of a fuel pump for a vehicle according to the present disclosure.

As illustrated in FIG. 4, a valve system for a vehicle may be configured to include a saddle type fuel tank 10 divided into a first fuel storage space 10-1 and a second fuel storage space 10-2, a reservoir cup 11 installed on a bottom side of the first fuel storage space 10-1 of the fuel tank 10 to be continuously filled with fuel in the fuel tank, a fuel pump 13 for pumping the fuel in the reservoir cup 11 to an engine and discharging some fuel to first and second jet pumps 12-1, 12-2, a fuel filter 14 installed inside the reservoir cup 11 to filter fuel supplied to the engine, the first jet pump 12-1 installed on a bottom side of the reservoir cup 11 to suck fuel in the first fuel storage space 10-1 of the fuel tank into the reservoir cup 11 and fill the reservoir cup with fuel, and the second jet pump 12-2 mounted at a predetermined location inside the reservoir cup 11 to suck fuel in the first fuel storage space 10-1 of the fuel tank into the reservoir cup 11 and fill the reservoir cup with fuel.

If the saddle type fuel tank is employed as the fuel tank 10, as illustrated in FIG. 2, in addition to the first jet pump 12-1 installed at the bottom side of the reservoir cup 11 to vacuum-suck the fuel in the first fuel storage space 10-1 of the fuel tank into the reservoir cup 11 and fill the reservoir cup with fuel, the second jet pump 12-1 for vacuum-sucking fuel in the second fuel storage space 10-2 into the reservoir cup 11 is mounted in the reservoir cup 11.

At this time, a first discharge port 13-1 for supplying the fuel in the reservoir cup 11 to the engine and a second discharge port 13-2 for discharging some fuel supplied to the engine to the jet pumps 12-1, 12-2 are formed on the fuel pump 13.

Accordingly, when the fuel pump 13 is driven, if fuel is discharged from the first discharge port 13-1 and pumped to the engine, some fuel is discharged through the second discharge port 13-2 to flow toward the first and second jet pumps 12-1, 12-2, so that the fuel present in the first fuel storage space 10-1 of the fuel tank 10 may be easily filled in the reservoir cup 11 by vacuum suction pumping of the first jet pump 12-1, and the fuel present in the second fuel storage space 10-2 of the fuel tank 10 may be easily filled in the reservoir cup 11 by vacuum suction pumping of the second jet pump 12-2.

According to the present disclosure, a jet pump control valve 100 is mounted on the second discharge port 13-2 of the fuel pump 13.

The jet pump control valve 100 is configured to close a jet pump-side flow path toward the jet pumps 12-1, 12-2 when a pressure of fuel supplied from the fuel pump 13 to the engine is lower than a prescribed fuel pressure at the engine start-up.

In addition, the jet pump control valve 100 is configured to open the jet pump-side flow path toward the jet pumps 12-1, 12-2 when the fuel pressure is equal to or higher than the prescribed fuel pressure at the engine start-up and to keep the jet pump-side flow path in an opened state even between a low load region in which the fuel pressure after the engine start-up may drop below the prescribed fuel pressure, and a high load region of the engine.

To this end, the jet pump control valve 100 is configured to include a first valve body 110 having a plunger ascending/descending path 112 having a predetermined height formed therein, and having the jet pump-side flow path 114 toward the jet pumps 12-1, 12-2 formed at an intermediate location of the plunger ascending/descending path 112, and a second valve body 120 provided in a structure in which a friction path 122 is formed and connected to an upper portion of the first valve body 110 to be in communication with the first valve body.

In addition, a plunger 130 is located in the plunger ascending/descending path 112 of the first valve body 110 to ascend/descend.

Preferably, the plunger ascending/descending path 112 is composed of an upper ascending/descending path 112-1 in which the plunger 130 is located to allow the jet pump-side flow path 114 to be opened and a lower ascending/descending path 112-2 in which the plunger 130 is located to allow the jet pump-side flow path 114 to be closed.

That is, the plunger ascending/descending path 112 has the upper ascending/descending path 112-1 in which the plunger 130 is located to allow the jet pump-side flow path 114 to be opened in the upper space thereof, and the lower ascending/descending path 112-2 in which the plunger 130 is located to allow the jet pump-side flow path 114 to be closed in the lower space thereof, with respect to the jet pump-side flow path 114.

In addition, a valve head 134 is located on the friction path 122 of the second valve body 120 to be in friction contact therewith and ascend/descend.

Preferably, the valve head 134 may be formed in a ball structure which is in friction contact with an inner surface of the friction path 122, and additionally, may also be formed in other shapes which may be in friction contact with the inner surface of the friction path 122.

To limit a vertical ascending/descending distance of the valve head 134, locking protrusions 124 are formed to protrude from the inner wall locations of the upper end and the lower end of the friction path 122, respectively, and the upper end and the lower end of the valve head 134 are locked to the locking protrusions 124, respectively.

At this time, an ascending/descending bar 132 is connected between an upper surface of the plunger 130 and a lower surface of the valve head 134, so that the plunger 130 and the valve head 134 perform the ascending/descending motion together.

In addition, a spring 140 is connected between an upper end of the second valve body 120 and the upper surface of the plunger 130 to be compressed.

Preferably, by detachably mounting a cover 126, to which the spring 140 is connected to the lower surface thereof, on the upper end of the second valve body 120, it is possible to easily embed the spring 140 inside the second valve body 120.

According to the present disclosure, the total pressure obtained by summing a first pressure (a pressure of fuel discharged from the second discharge port of the fuel pump) acting on a lower portion of the plunger 130 to allow the valve head 134 to frictionally ascend from a lower portion to an upper portion of the friction path 122, and a second pressure for compressing the spring 140 when the plunger 130 and the valve head 134 ascend is set to be equal to or higher than the prescribed fuel pressure at the engine start-up at which fuel is supplied from the fuel pump 13 to the engine.

For example, the first pressure acting on the lower portion of the plunger 130 to allow the valve head 134 to frictionally ascend from the lower portion to the upper portion of the friction path 122 is set to 1.5 bar, and the second pressure for compressing the spring 140 when the plunger 130 and the valve head 134 ascend is set to 3 bar, so that the total pressure obtained by summing the first pressure and the second pressure may be set to 4.5 bar which is the prescribed fuel pressure at the engine start-up at which fuel is supplied from the fuel pump 13 to the engine.

Here, an operation flow for the valve system of the fuel pump according to the present disclosure having the above configuration will be described as follows.

Figure 5:
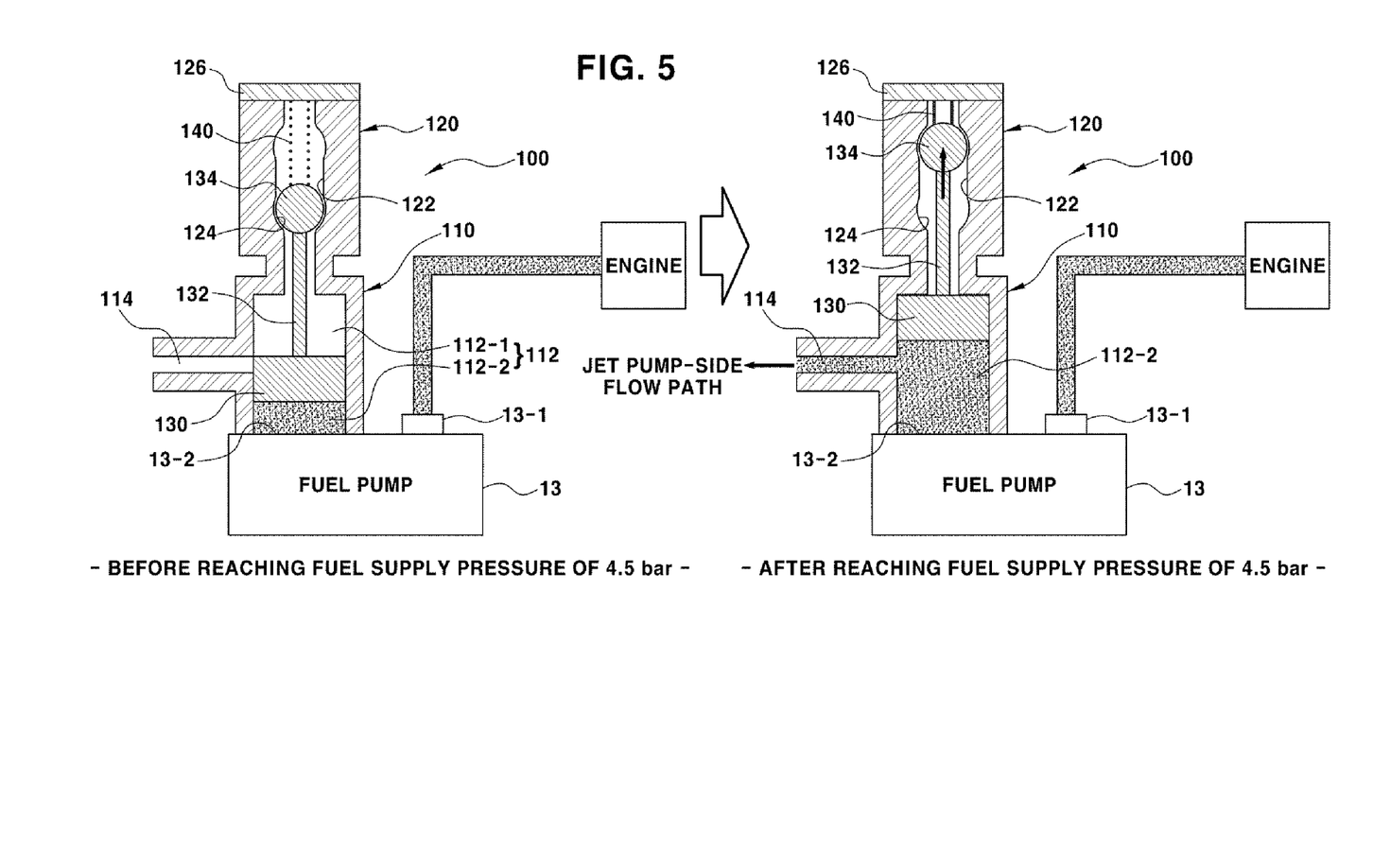
FIGS. 5 to 7 are cross-sectional views illustrating operation states for the valve system of the fuel pump for a vehicle according to the present disclosure.

FIG. 5 illustrates an operating state of the valve system according to the present disclosure at the engine cold start-up.

Upon the engine cold start-up, the engine may be smoothly started-up only when the fuel pump is driven and the pressure of fuel supplied from the fuel pump to the engine reaches the prescribed fuel pressure at the engine start-up.

However, when fuel is pumped from the fuel pump to the engine at the engine cold start-up, some fuel is discharged to the first and second jet pumps, so that some fuel at this time acts as loss of the flow rate, and thus it takes a long time to increase the pressure of fuel supplied from the fuel pump to the engine to the prescribed fuel pressure required for the start-up, which results in a problem of deteriorating cold startability which prevents the engine from starting-up smoothly.

In order to solve the above problem, if the pressure of fuel supplied from the fuel pump 13 to the engine is lower than the prescribed fuel pressure at the engine start-up, as illustrated in the left figure of FIG. 5, the valve head 134 is located on the lowermost portion of the friction path 122 of the second valve body 120 and the plunger 130 is located in the lower ascending/descending path 112-2 of the plunger ascending/descending path 112 of the first valve body 110, so that the jet pump-side flow path 114 is kept in a closed state, and as a result, some fuel discharged from the fuel pump is not supplied to the first and second jet pumps through the jet pump-side flow path 114, thereby preventing some fuel from acting as the loss of the flow rate.

For example, when the pressure of fuel supplied from the fuel pump 13 to the engine does not reach 4.5 bar which is the prescribed fuel pressure at the engine start-up, the jet pump-side flow path 114 is kept in the closed state.

That is, when the pressure of fuel supplied from the fuel pump 13 to the engine is not equal to or higher than the total pressure 4.5 bar obtained by summing the first pressure of 1.5 bar, which acts on the lower portion of the plunger 130 to allow the valve head 134 to frictionally ascend from the lower portion to the upper portion of the friction path 133, and the second pressure of 3 bar for compressing the spring 140 when the plunger 130 and the valve head 134 ascend, as described above, the jet pump-side flow path 114 is kept in the closed state by the plunger 130.

As described above, when the pressure of fuel supplied from the fuel pump 13 to the engine does not reach 4.5 bar which is the prescribed fuel pressure at the engine start-up, the jet pump-side flow path 114 is kept in the closed state by the plunger 130, so that some the fuel discharged from the fuel pump is not supplied to the first and second jet pumps through the jet pump-side flow path 114, thereby preventing some fuel from acting as the loss of the flow rate.

By cutting off the discharge of some fuel to the jet pump-side flow path 114 and continuously driving the fuel pump, the pressure of fuel supplied from the fuel pump 13 to the engine may be quickly increased to 4.5 bar which is the prescribed fuel pressure at the engine start-up.

Figure 8:
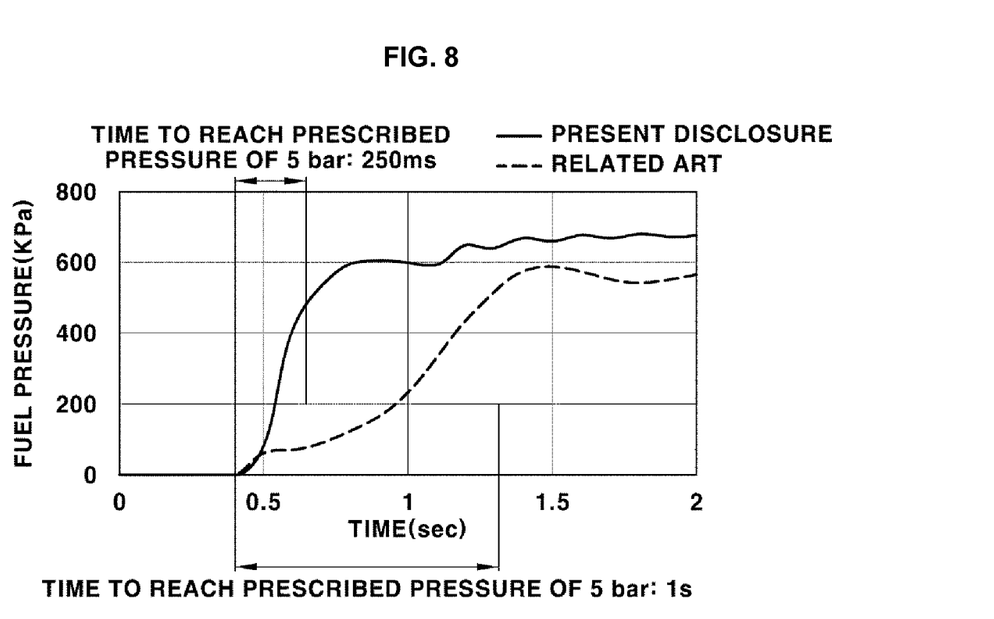
FIG. 8 is a graph illustrating an evaluation result of cold startability of the engine for the valve system of the fuel pump for a vehicle according to the present disclosure.

Referring to FIG. 8, as compared with a conventional configuration in which the time required for increasing the pressure of fuel supplied from the fuel pump to the engine to the prescribed fuel pressure at the engine cold start-up is conventionally delayed by about 1 second or more, the present disclosure may shorten the time to about 250 ms or less, and thus the engine may be started-up quickly and smoothly even at the engine cold start-up, thereby improving cold startability of the engine.

At this time, when the pressure of fuel supplied from the fuel pump 13 to the engine is equal to or higher than 4.5 bar which is the prescribed fuel pressure at the engine start-up, the engine is started-up, and as illustrated in a right figure of FIG. 5, the plunger 130 ascends to the upper ascending/descending path 112-1 of the plunger ascending/descending path 112 and the valve head 134 is moved to the uppermost location of the friction path 122 while compressing the spring 140, so that the jet pump-side flow path 114 is in an opened state of being in communication with the second discharge port 13-2 of the fuel pump 13.

That is, when the pressure of fuel supplied from the fuel pump 13 to the engine is equal to or higher than the total pressure of 4.5 bar obtained by summing the first pressure of 1.5 bar acting on the lower portion of the plunger 130 to allow the valve head 134 to frictionally ascend from the lower portion to the upper portion of the friction path 122 and the second pressure of 3.0 bar for compressing the spring 140 when the plunger 130 and the valve head 134 ascend, the plunger 130 ascends to the upper ascending/descending path 112-1 of the plunger ascending/descending path 112 as described above, so that the jet pump-side flow path 114 is in an opened state of being in communication with the second discharge port 13-2 of the fuel pump 13.

Accordingly, when fuel is discharged from the first discharge port 13-1 of the fuel pump 13 and pumped to the engine after the engine start-up, some fuel may be discharged through the second discharge port 13-2 to flow toward the first and second jet pumps 12-1, 12-2, thereby easily exerting their own functions of the first and second jet pumps 12-1, 12-2 for filling fuel.

That is, the fuel present in the first fuel storage space 10-1 of the fuel tank 10 may be easily filled in the reservoir cup 11 by vacuum suction pumping of the first jet pump 12-1, and the fuel present in the second fuel storage space 10-2 of the fuel tank 10 may be easily filled in the reservoir cup 11 by vacuum suction pumping of the second jet pump 12-2.

Figure 6:
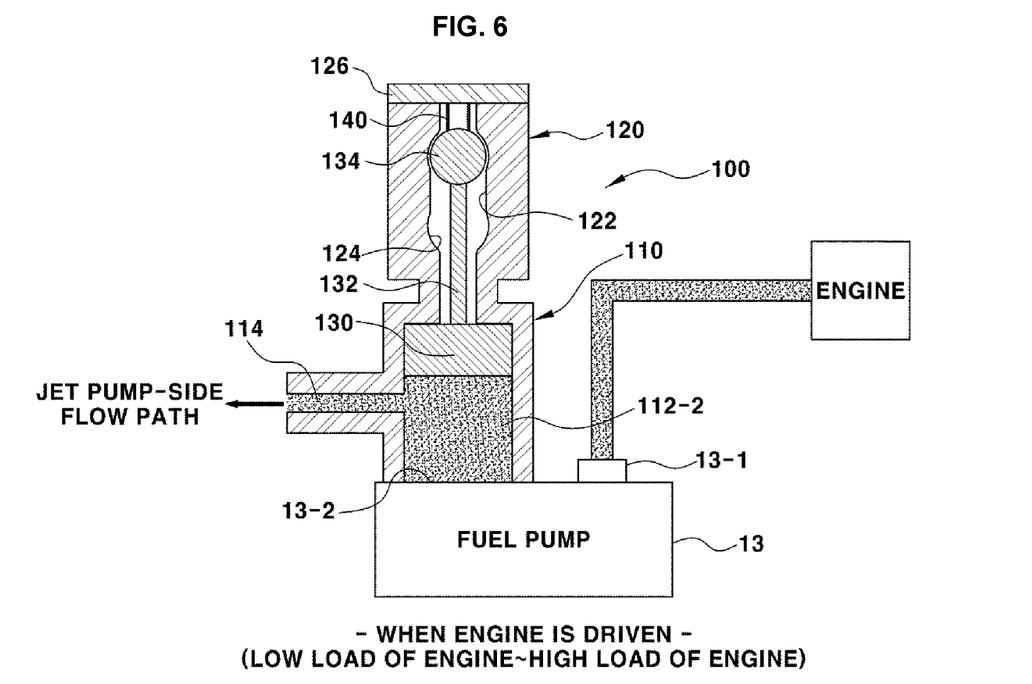

FIG. 6 illustrates an operation state where the valve system according to the present disclosure is driven after the engine start-up.

As described above, after the engine start-up, the plunger 130 ascends to the upper ascending/descending path 112-1 of the plunger ascending/descending path 112 and the valve head 134 ascends to the uppermost location of the friction path 122 while compressing the spring 140, so that the jet pump-side flow path 114 is in an opened state of being in communication with the second discharge port 13-2 of the fuel pump 13.

At this time, in the low load region and the intermediate load region of the engine, the pressure of fuel supplied from the fuel pump 13 to the engine may drop below the prescribed fuel pressure at the engine start-up.

For example, although the pressure of fuel supplied from the fuel pump to the engine in the high load region of the engine is 5 bar, the pressure of fuel supplied from the fuel pump to the engine may drop to 3 bar smaller than 4.5 bar, which is the prescribed fuel pressure at the engine start-up, in the low load region of the engine and the pressure of fuel supplied from the fuel pump to the engine may drop to about 4 bar smaller than 4.5 bar, which is the prescribed fuel pressure at the engine start-up, even in the intermediate load region of the engine.

As described above, even though the pressure of fuel supplied from the fuel pump 13 to the engine drops below the prescribed fuel pressure at the engine start-up in the low load region and the intermediate load region of the engine, when the fuel pressure is equal to or higher than the second pressure (for example, 3 bar) for compressing the spring 140, the plunger 130 is continuously located in the upper ascending/descending path 112-1 of the plunger ascending/descending path 112 and the valve head 134 is also continuously located on the uppermost portion of the friction path 122, so that the jet pump-side flow path 114 may be continuously kept in the opened state.

More specifically, even though the pressure of fuel supplied from the fuel pump 13 to the engine drops below the prescribed fuel pressure at the engine start-up, when the fuel pressure is equal to or higher than the second pressure (for example, 3 bar) for compressing the spring 140, a force of 3 bar or more greater than an elastic restoring force of the spring 140 is applied to the plunger 130 to allow the spring 140 to be continuously kept in a compressed state, and at a result, the plunger 130 is continuously located in the upper ascending/descending path 112-1 of the plunger ascending/descending path 112 and the valve head 134 is also continuously located on the uppermost portion of the friction path 122, so that the jet pump-side flow path 114 may be continuously kept in the opened state.

Accordingly, in the low load region and the intermediate load region of the engine, when fuel is discharged from the first discharge port 13-1 of the fuel pump 13 and pumped to the engine, some fuel may be discharged through the first discharge port 13-1 to flow toward the first and second jet pumps 12-1, 12-2 through the jet pump-side flow path 114, thereby easily exerting their own functions of the first and second jet pumps 12-1, 12-2 for filling fuel.

Meanwhile, a general check valve may also be employed as the jet pump control valve.

Of course, since the general check valve is opened and closed at the same pressure, the check valve is opened under the prescribed fuel pressure to allow fuel to be smoothly supplied to the engine at the engine cold start-up, thereby improving cold startability.

However, when the fuel supply pressure drops below the prescribed fuel pressure at the engine cold start-up in the low load region or the intermediate load region after the engine start-up, the general check valve may block the jet pump-side flow path toward the jet pump, thereby losing the jet pump's own function which sucks the fuel in the fuel tank into the reservoir cup and fill the reservoir cup with fuel, so that there may occur a problem in that it is impossible to fill the fuel in the reservoir cup.

On the contrary, the present disclosure opens the jet pump-side flow path 114 after the engine start-up as described above, and then allows the jet pump-side flow path 114 to be kept in the opened state even between the low load region and the high load region of the engine as described above, so that their own functions of the first and second jet pumps 12-1, 12-2 filling the fuel in the fuel tank in the reservoir cup after the engine start-up may be smoothly kept.

Figure 7:
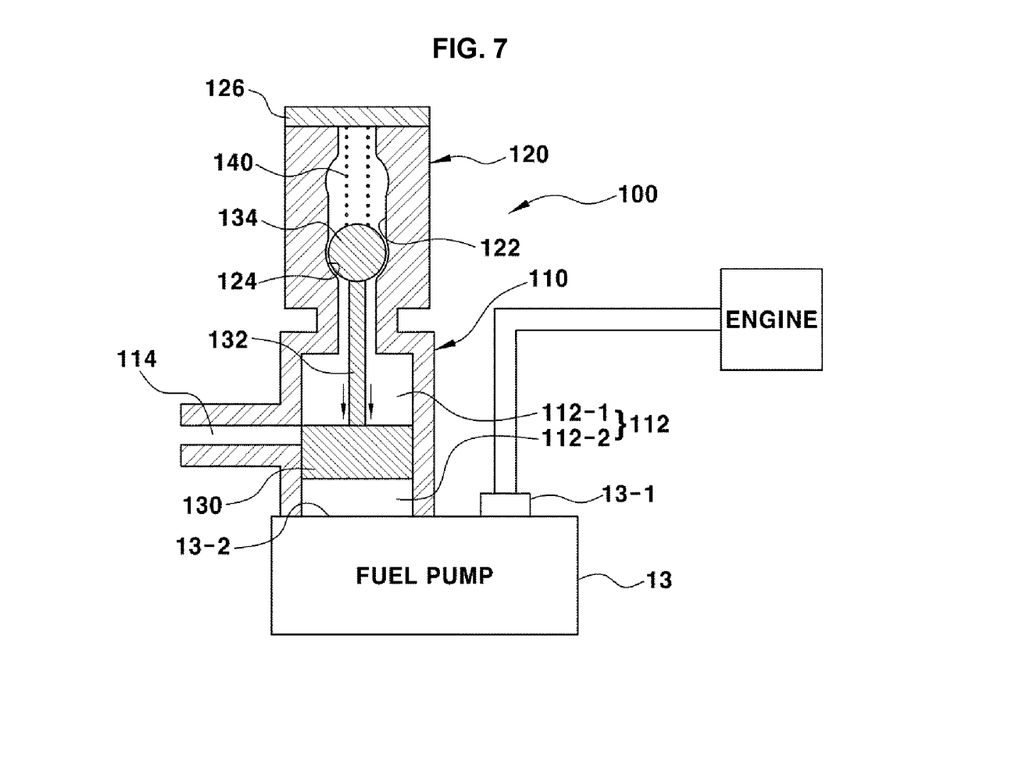

FIG. 7 illustrates an operation state of the valve system according to the present disclosure when the engine is turned off.

When the engine is turned off and the pressure of fuel supplied from the fuel pump 13 to the engine is equal to or lower than 5 bar, the valve head 134 is moved to the lowermost portion of the friction path 122 of the second valve body 120 by the elastic restoring force of the spring 140 and the plunger 130 is moved to the lower ascending/descending path 112-2 of the plunger ascending/descending path 112 of the first valve body 110, so that the jet pump-side flow path 114 becomes in a closed state.

As described above, by closing the jet pump-side flow path 114 until the pressure of fuel supplied from the fuel pump 13 to the engine reaches the prescribed fuel pressure at the engine start-up, it is possible to remove the loss of the fuel discharged to the jet pumps 12-1, 12-2 at the engine cold start-up, thus to shorten the time required for increasing the pressure of fuel supplied from the fuel pump 13 to the engine to the prescribed fuel pressure at the engine cold start-up, and as a result, to improve cold startability of the engine.

Furthermore, the jet pump-side flow path may be opened after the engine start-up, and then the jet pump-side flow path may be kept in the opened state, thereby smoothly keeping the jet pump's own function which fills the fuel in the fuel tank in the reservoir cup after the engine start-up.

As described above, although the present disclosure has been described as one exemplary embodiment, the scope of the present disclosure is not limited to the aforementioned one exemplary embodiment, and various modifications and improvements by those skilled in the art using the basic principle of the present disclosure defined in the appended claims will be also included in the scope of the present disclosure.

What is claimed is:

1. A valve system of a fuel pump for a vehicle, the valve system comprising:
a reservoir cup mounted in a fuel tank;
a jet pump for filling the reservoir cup with fuel in the fuel tank;
a fuel pump on which a first discharge port for discharging the fuel in the reservoir cup to an engine and a second discharge port for discharging some fuel discharged to the engine to the jet pump are formed; and
a jet pump control valve mounted on the second discharge port of the fuel pump,
wherein the jet pump control valve is configured to close a jet pump-side flow path toward the jet pump when a pressure of fuel supplied from the fuel pump to the engine is lower than a prescribed fuel pressure at an engine start-up, to open the jet pump-side flow path toward the jet pump when the fuel pressure is equal to or higher than the prescribed fuel pressure at the engine start-up, and to keep the jet pump-side flow path in an opened state even between a low load region and a high load region of the engine after the engine start-up,
wherein the jet pump control valve comprises:
a first valve body having a plunger ascending/descending path having a predetermined height formed therein, and the jet pump-side flow path toward the jet pump formed at an intermediate location of the plunger ascending/descending path;
a second valve body provided in a structure having a friction path formed therein and formed on an upper portion of the first valve body to be in communication with the first valve body;
a plunger located in the plunger ascending/descending path to ascend/descend;
a valve head located to be in friction contact with the friction path and to ascend/descend;
an ascending/descending bar connected between the plunger and the valve head; and
a spring connected between an upper end of the second valve body and an upper surface of the plunger to be compressed, and
wherein the friction path has locking protrusions formed on an upper end and a lower end thereof, the locking protrusions limiting an ascending/descending distance of the valve head.

2. The valve system of claim 1,
wherein the plunger ascending/descending path comprises: an upper ascending/descending path in which the plunger is located to allow the jet pump-side flow path to be opened and a lower ascending/descending path in which the plunger is located to allow the jet pump-side flow path to be closed.

3. The valve system of claim 1,
wherein the valve head is formed in a ball structure which is in friction contact with an inner surface of the friction path.

4. The valve system of claim 1,
wherein a total pressure obtained by summing a first pressure acting on the plunger to allow the valve head to frictionally ascend from a lower portion to an upper portion of the friction path, and a second pressure for compressing the spring when the plunger and the valve head ascend is set to be equal to or higher than the prescribed fuel pressure at the engine start-up at which fuel is supplied from the fuel pump to the engine.

5. The valve system of claim 4,
wherein when the pressure of fuel supplied from the fuel pump to the engine is lower than the prescribed fuel pressure at the engine start-up, the valve head is located on the lower portion of the friction path and the plunger is located in the lower ascending/descending path of the plunger ascending/descending path to allow the jet pump-side flow path to be kept in a closed state.

6. The valve system of claim 4,
wherein when the pressure of fuel supplied from the fuel pump to the engine is equal to or higher than the prescribed fuel pressure at the engine start-up, the plunger ascends to the upper ascending/descending path of the plunger ascending/descending path and the valve head ascends to the upper portion of the friction path while compressing the spring to allow the jet pump-side flow path to be opened.

7. The valve system of claim 4,
wherein in the low load region and an intermediate load region of the engine after the engine start-up, even though the pressure of fuel supplied from the fuel pump to the engine drops below the prescribed fuel pressure at the engine start-up, when the fuel pressure is equal to or higher than the second pressure for compressing the spring, the plunger is continuously located in the upper ascending/descending path of the plunger ascending/descending path and the valve head is also continuously located on an upper portion of the friction path to allow the jet pump-side flow path to be kept in an opened state.

8. The valve system of claim 1,
wherein a cover having the spring connected to the lower surface thereof is detachably mounted on an upper end of the second valve body.

* * * * *